Figure 1:
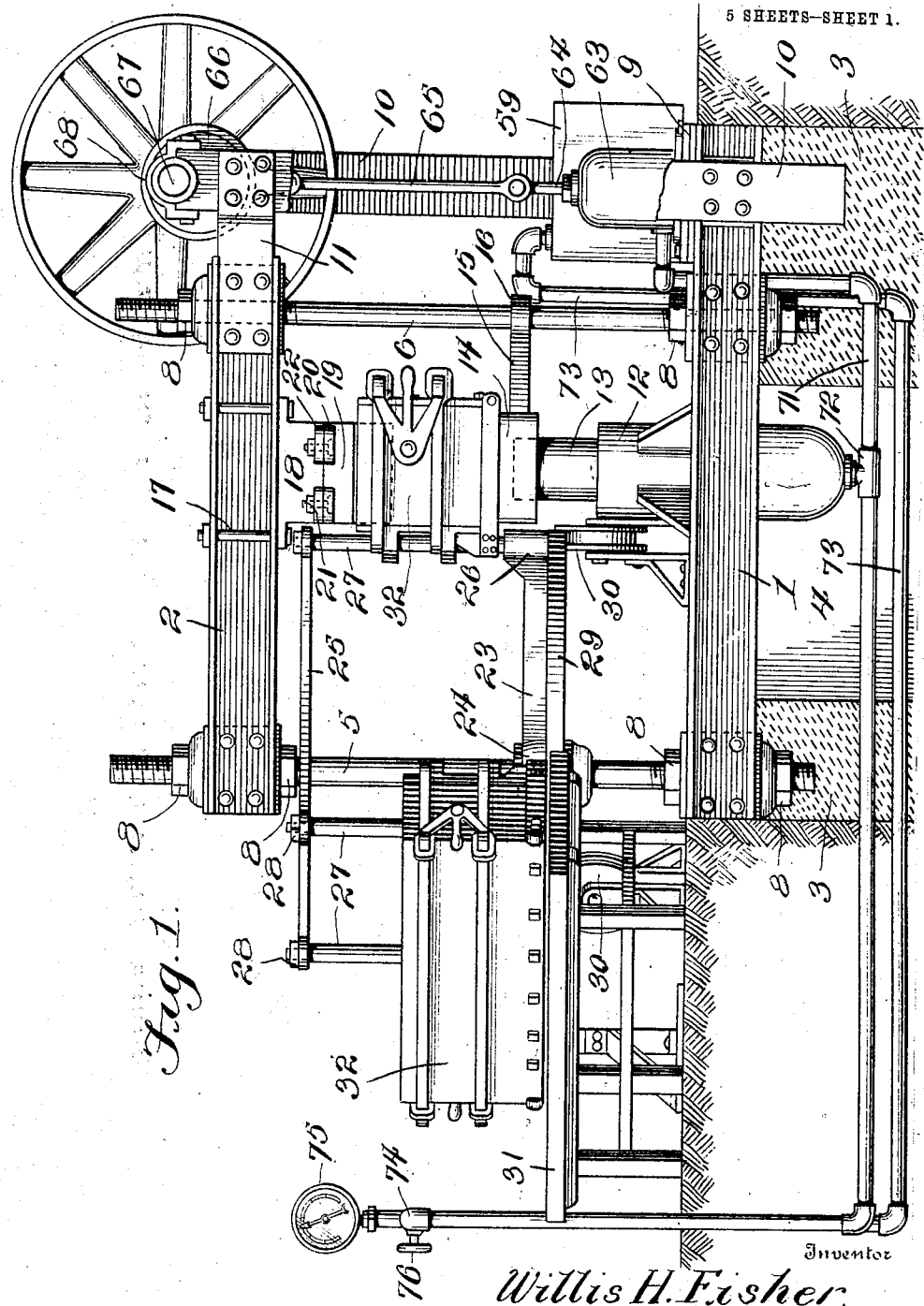

W. H. FISHER.
MOLDING APPARATUS.
APPLICATION FILED MAY 14, 1909.

985,576.

Patented Feb. 28, 1911.
5 SHEETS—SHEET 1.

Witnesses
J. T. L. Wright
C. C. Hines

Inventor
Willis H. Fisher,
By Victor J. Evans,
Attorney

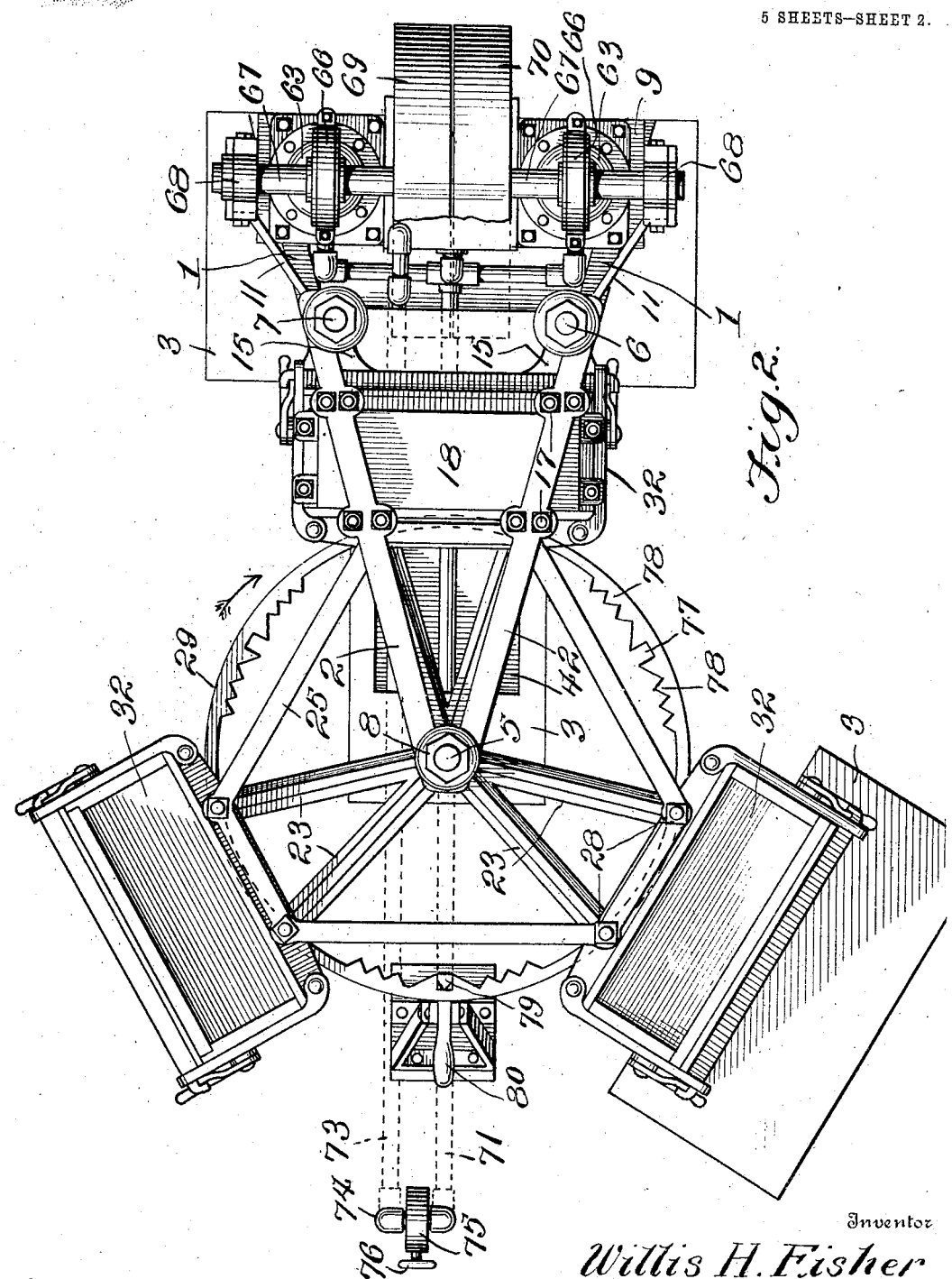

W. H. FISHER.
MOLDING APPARATUS.
APPLICATION FILED MAY 14, 1909.
985,576.
Patented Feb. 28, 1911.
5 SHEETS—SHEET 3.
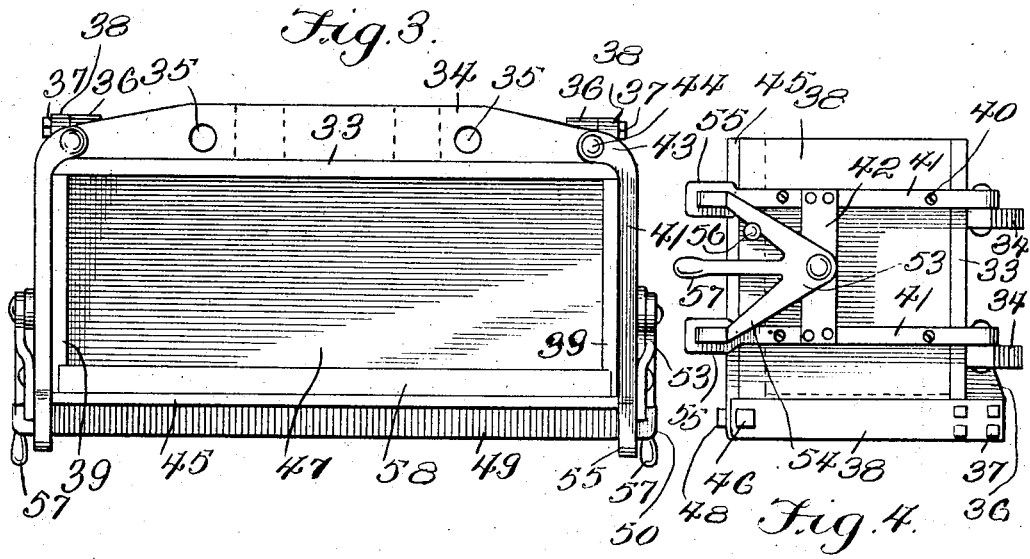
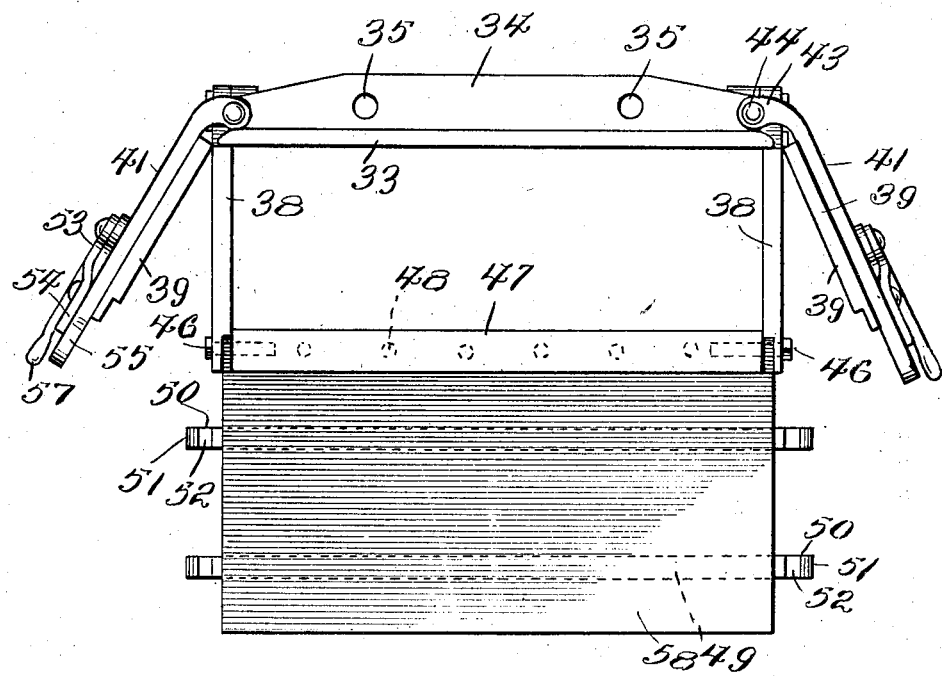
Witnesses
J. L. Wright
C. C. Hines
Inventor
Willis H. Fisher,
By Victor J. Evans,
Attorney

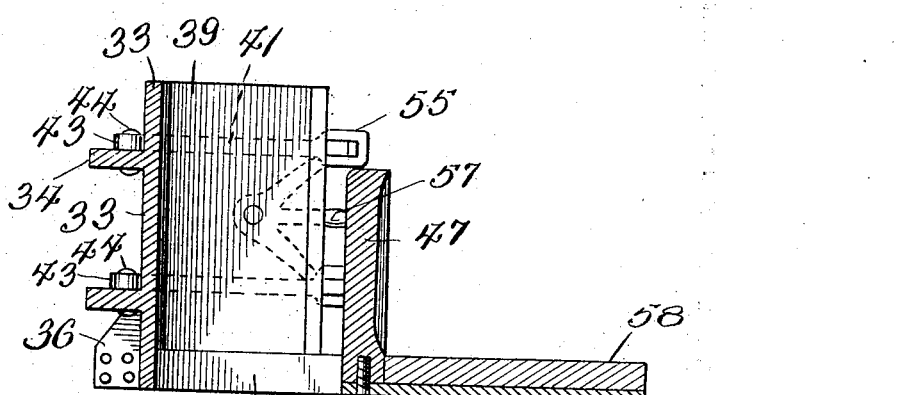
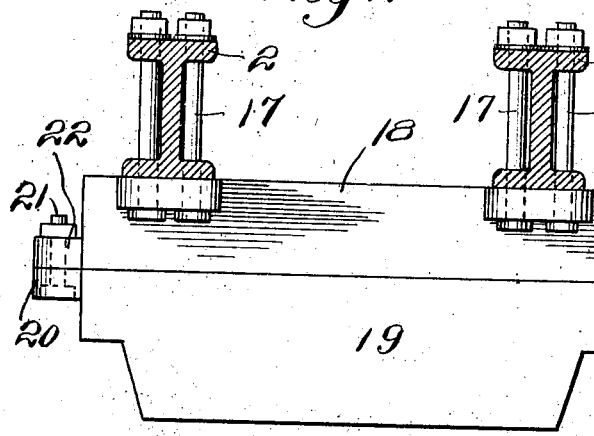
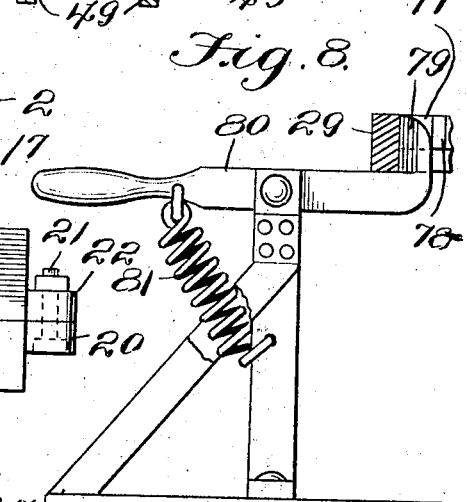
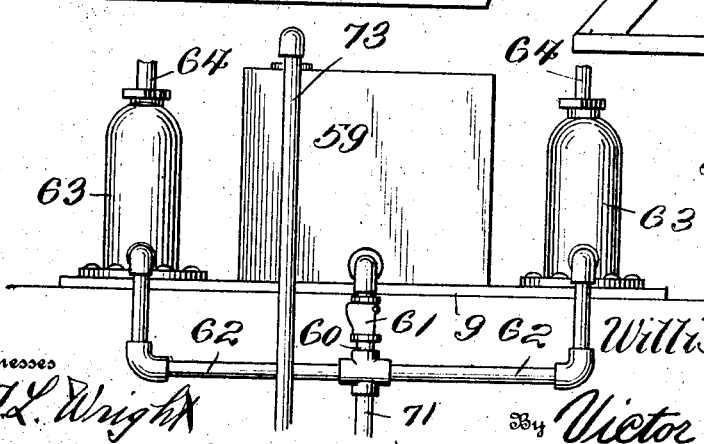

W. H. FISHER.
MOLDING APPARATUS.
APPLICATION FILED MAY 14, 1909.

985,576.

Patented Feb. 28, 1911.
5 SHEETS—SHEET 5.

Witnesses
J. L. Wright
K. Allen

Inventor
Willis H. Fisher,
By Victor J. Evans,
Attorney

UNITED STATES PATENT OFFICE.

WILLIS H. FISHER, OF BALTIMORE, MARYLAND.

MOLDING APPARATUS.

985,576.                    Specification of Letters Patent.     Patented Feb. 28, 1911.

Application filed May 14, 1909. Serial No. 495,852.

*To all whom it may concern:*

Be it known that I, WILLIS H. FISHER, a citizen of the United States, residing at Baltimore, State of Maryland, have invented new and useful Improvements in Molding Apparatus, of which the following is a specification.

This invention relates to a press or apparatus for molding blocks or other articles from concrete or other plastic materials, and particularly to an apparatus for manufacturing concrete building blocks.

The main object of the invention is to provide an apparatus of this character in which the pressure applying element of the molding mechanism is adapted in operation to apply great pressure upon the material and is vibrated in its pressure applying action so as to exert a pounding pressure, whereby the air held within cells in the body of the material will be displaced and the cells broken up to compress the material into a solid homogeneous mass, thus forming a block of high durability and strength and practically impervious to moisture.

A further object of the invention is to provide an apparatus of this character embodying a series of molds adapted to be successively brought into registering position with the pressure producing element, and whereby the parts may be quickly and conveniently operated to produce a maximum number of blocks within a minimum period of time, and further to provide an apparatus of sufficient strength to withstand the imposed strains and in which the pressure producing element is adapted to be operated by an economical type of fluid pressure means.

A still further object of the invention is to provide an apparatus which may be readily operated and controlled by a minimum number of attendants, which may be employed for the production of either plain or ornamental blocks of any desired type, which is so constructed as to insure the exact registry of the parts of the molding mechanism when brought into operative position and to stay and strengthen the same to effectually sustain the strains transmitted during the formation of a block, and in which the mold boxes or chambers are of such construction as to facilitate the discharge of the completed block or article.

With these and other objects in view, the invention consists of the features of construction, combination and arrangement of parts hereinafter fully described and claimed, reference being had to the accompanying drawings, in which:—

Figure 11:
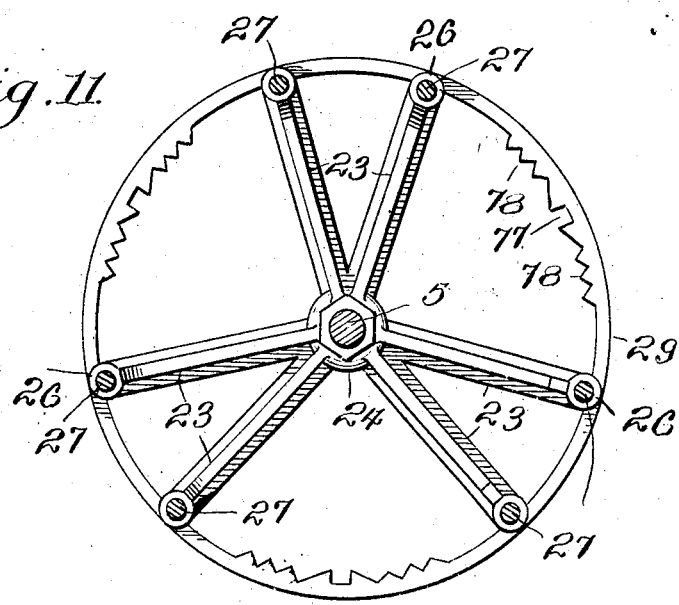
Figure 10:
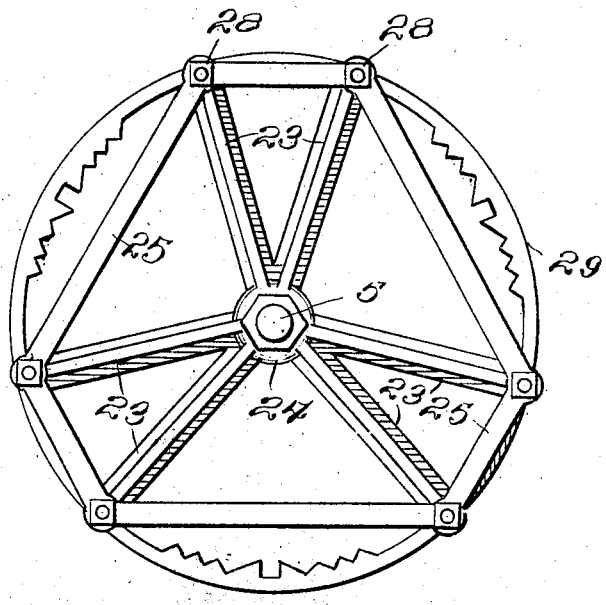

Figure 1 is a side elevational view, with parts broken away, of a molding apparatus embodying my invention, showing one of the mold boxes arranged in line with the pressure producing element and another disposed in discharging position. Fig. 2 is a top plan view of the same with parts omitted and others partially broken away and indicated in dotted lines to better illustrate the construction. Fig. 3 is a top plan view of one of the mold boxes or chambers. Fig. 4 is an end elevation of the same. Fig. 5 is a view similar to Fig. 3, showing the movable parts of the mold block swung outward to open position. Fig. 6 is a transverse section through the mold box with parts arranged as shown in Fig. 5. Fig. 7 is a transverse section through the upper frame beams, showing the manner of supporting the core or forming element. Fig. 8 is a sectional elevation illustrating the means for locking the rotary carrier in its stationary positions. Fig. 9 is a front elevational view of parts of the hydraulic pump. Figs. 10 and 11 are top plan and horizontal sectional views of the carrier frame with the mold boxes removed.

The frame of the apparatus comprises a pair of sill beams 1 and a pair of head beams 2, arranged one above the other and with the beams of each pair divergently disposed. The sill beams rest upon and may be embedded in a bed of concrete or masonry 3 formed to provide a pit 4. Extending upwardly from the converging ends of the beams 1 to and through the converging ends of the beams 2 is a tie or strainer rod 5, and connecting the divergent ends of the pairs of beams are similar tie or strainer rods 6 and 7, which rods are clamped to the respective beams by nuts 8 and are embedded at their lower ends in the foundation 3. The beams are preferably of the I-type and the rods are arranged to form therewith connected triangular upper and lower frame sections of great strength and durability. The divergent ends of the sill beams 1 are extended beyond the rods 6 and 7 to form supports for a base or platform 9 constituting a part of the frame of a fluid pressure pumping mechanism hereinafter described, which frame includes a pair of standards or uprights 10 fixed at their lower ends to said base or platform and connected at their upper ends with the beams 2 by coupling or tie plates 11.

Supported by the beams 1 and extending at its lower end into the pit 4 is a cylinder 12 in which operates a plunger or ram 13 carrying a removable pressure head 14 having a socket in its under side receiving the upper end of the ram, said head being provided with diverging arms 15 having eyes 16 slidably engaging the rods 6 and 7, by which the ram and head are guided in their up and down movements. Secured by bolts 17 to the beams 2 above and in vertical alinement with the head 14 is a bar or head 18 carrying a core or forming member 19 adapted to produce a cavity in the block to be formed or to give any other desired configuration to one of the sides of the block. This core or forming member is provided at its ends with ears 20 connected by bolts 21 with similar ears 22 on the ends of the head 18, by which the core is rendered readily removable, so that different sizes of cores or cores designed to produce different configurations may be employed.

Mounted to rotate upon the rod 5, which forms a pivot support or axle, is a rotating carrier 23 comprising upper and lower skeleton frames or spiders, the lower frame or spider consisting of an annular series of divergently arranged pairs of radial arms 24 extending equidistantly from a common hub or center journaled on the rod, while the upper frame or spider 25 is of substantially triangular form and provides a bracing connection between the mold boxes, a plurality of which are employed, and simply rotates with the lower spider about the rod as a center. The outer ends of the respective pairs of arms of the lower spider or frame are formed with upstanding lugs or enlargements 26, which are preferably flat faced on their outer sides and formed with sockets in which are fitted and secured the lower ends of guide rods 27 arranged in pairs passing through and connected at their upper ends with the angles of the upper spider by nuts 28, so as to connect the two frames and spiders together and provide a carrier of strong and durable construction. The arms 23 carry an annular rim 29, which forms a part of the lower frame or main structure of the carrier and which, in the rotation of the carrier is adapted to run in contact with and be supported by rollers 30 arranged at suitable points in the path of rotation of the carrier, to maintain said carrier in a level position and to assist the rod 5 and parts of the main frame to sustain the weight of the carrier and the mold boxes. The carrier is adapted to rotate in the direction of the arrow shown in Fig. 2, and arranged at a point in its path of rotation is a table or support 31 over which each mold box passes after the formation of the block therein and upon which the block is designed to be discharged.

The mold boxes 32 may be of any suitable size and form for the production of blocks or articles of any suitable dimensions and shapes. In the present instance, I have shown three such boxes supported equidistantly upon and projecting beyond the carrier so as to be successively brought into registering relation with and between the ram and core by intermittent movements of the carrier in its course of rotation. Each carrier is mounted for vertical movement upon a pair of the rods 27 and comprises an inner or rear wall 33 provided on its outer face with a pair of parallel longitudinal flanges 34 having openings 35 for the passage of the rods 27, by which the box is supported by and mounted to slide upon the rods. Adjacent the lower corners of the wall 33 are formed lugs 36, to which are bolted, as at 37, bars 38 forming bottom end bars of the mold structure. The end walls of the mold box are formed by pattern plates 39 which are detachably secured by screws 40 to an end frame composed of parallel bars 41 connected by a vertical cross piece 42. The inner ends of the bars 41 are curved inwardly in rear of the wall 33 to form knuckles 43 which are hinged to the ends of the ribs or flanges 34 by pins or bolts 44, so as to permit the end walls to swing outwardly to an open position, as shown in Figs. 5 and 6. The outer or front wall 45 of the mold box is hinged or pivoted at its lower corner edges upon pins or screws 46 extending through the outer ends of the bars 38, which pins or screws also enter the adjacent end edges of the bottom wall 47 of the box which is detachably secured at its outer edge to the lower edge of the front wall by screws 48, whereby it is adapted to swing with said front wall.

In practice, the wall 33, which is the only permanent wall of the box, and which forms the bottom face of the block or article, may be plain surfaced, while the front, end and bottom walls, which are detachable, form patterns which may be designed to give any preferred shape to the walls of the block formed thereby, the construction described permitting of the use of any desired kinds of pattern plates. The rear wall may, however, be designed to produce any desired ornamental finish, but this, of course, is not essential.

Formed or secured on the outer side of the front wall 45 are longitudinal bars or ribs 49 having their ends extending beyond the ends of the wall and shaped to provide locking lugs or projections 50, each having a beveled outer end 51 and a locking notch or recess 52. A locking device is mounted upon each end wall to engage the said locking lugs in order that the movable walls of the mold may be held firmly and securely in closed position. Each of these locking devices comprises a triangular locking member 53 pivotally connected with the cross piece 42 for movement in a vertical plane and having outwardly extending diverging locking arms 54 whose outer or free ends are properly constructed to engage the notches 52 in the lugs 50. The ends of the bars 41 are provided with slots or eyes 55 through which the lugs project when the walls are closed, thus coupling the front wall with the end walls, which latter are held from outward movement by the engagement of the arms of the locking devices with the lugs. A stop pin 56 is provided upon each end wall to engage one of the arms of the locking device when the latter is in locking position, to limit the downward movement of said device, and the latter is provided on a line between its locking arms with a handle or lever 57 by which it may be swung upward to release the arms from engagement with the lugs, to permit the walls to be thrown open. By this construction a simple and effective type of locking means is provided by which the movable walls will be held securely in closed position and sustained to support the strain falling upon them during the compression of the material into a block. When the front wall is closed, the bottom wall 47 will also be in position to close the bottom of the mold, as will be readily understood. A pallet board 58 is adapted to be arranged on the inner side of the front wall 45 to form a pattern and to support the block when removed from the mold and discharged upon the receiving table 31.

In the operation of the apparatus, the carrier may be intermittently rotated by hand or power to successively bring the mold boxes at the filling, compression and discharge points, Fig. 2 showing the boxes arranged at these respective points. Preliminarily to filling each box, the box is closed, as will be readily understood, and is then supplied in any suitable manner with a charge of the concrete or plastic material which is to be compressed. The carrier is then given a one-third revolution to bring the filled box between the compression head and mold box, at which time the compression head is forced upwardly, carrying with it the box which slides on the guides 27, so that the core is caused to enter the top of the box and form a cavity in the top of the plastic material, as well as to compress the material to produce a finished block of the desired density. After the completion of the compressing action, the head and box are lowered and the table again given a one-third revolution to bring the succeeding filled box into compressing condition, to move the box containing the completed block to discharge position over the table 31, and to move the preceding box which has just been emptied of its contents to filling position. The carrier is stably supported and guided in its movements so as to permit just sufficient clearance between the box, compression head and core to permit the box to move easily between the head and core. When the box is lowered after the compressing action its lugs 36 engage the stops 26 at the outer ends of the arms 23, thus locking the box to the carrier frame so that it cannot possibly have any independent movement during its further travel, so that the box will be strongly supported and the guide relieved to a large extent from the strain of the weight thereof. As each box containing a formed block moves over the table 31, the operator releases the locking devices 53 and swings the end walls of the box open, after which the front wall 45 is swung outwardly and downwardly upon the table, carrying with it the bottom wall 47, by which these walls will be adjusted to the position shown in Fig. 6, so that the block will rest upon the pallet board 48, which may then be slid off the wall 35 onto the table 31, from which the block still resting on the pallet board may be removed and carried to a drying rack. The walls of the box are then closed, the carrier turned to bring the box to filling position, and the cycle of operation repeated as above described.

The fluid pressure mechanism for operating the ram is preferably of the hydraulic type, but any suitable fluid pressure mechanism may be employed. It is designed in practice to continuously use a supply of water, which may be replenished at periods to compensate for that lost by evaporation or leakage, but oil or any other suitable liquid may be used, if desired. On the base 9 is mounted a storage tank or chest 59 having an outlet connection 60 controlled by a check valve 61. This connection 60 is in communication beyond the valve through feed pipes 62 with the discharge ports of pump cylinders 63 mounted on the base on opposite sides of said tank or chest. Operating within said cylinders are pistons or plungers, the rods 64 of which are coupled by connecting rods 65 with the straps of eccentrics 66 on a drive shaft 67 journaled in bearings 68 on the upper end of the standards 10, which shaft also carries fast and loose pulleys 69 and 70 for coöperation with the drive belt leading from a suitable source of power. The pumps operate to draw water through the outlet connection 60 and pipes 62 into the cylinders, the check valve 61 opening to permit water to discharge from the tank and then closing to prevent its return, and then force the water from the cylinders through the pipes 62 into a supply pipe 71 connected by a union 72 with the lower end of the ram cylinder 12, and the water is returned to the tank through a return pipe 73. The outer or forward ends of the two pipes 71 and 73 extend in parallel relation to a point beyond the carrier in the central line of the machine and on opposite sides of the box filling and discharge points, where the said pipes extend upwardly in the form of a loop and are united by a union 74 carrying a gage 75 by which the pressure of the flowing liquid may be determined at any time. In the union 74 is a controlling valve 76 which is adapted to be manipulated by the operator to control the ascent and descent of the ram 13. As the eccentrically driven pumps are continuously operated, there is a constant flow of water under fluctuating pressure from the tank to the pumps, thence outward through the supply pipe 71 and finally back to the tank through the return pipe 73 when the valve 76 is opened. As a result, the water is circulated under such conditions without influencing the ram 13. When a box is in position between the ram and core, however, for a compressing action, the operator closes the valve 76, thus cutting off communication between the two pipes 71 and 73, by which the fluid pumped into the pipe 71 is caused to rise into the cylinder 12 and elevate the plunger 13, carrying with it the compression head 14, whereby the box is elevated and the material therein compressed. Through the variation or fluctuation in the volume of flow of the water there is a proportionate variation or fluctuation of pressure in the cylinder 12 by which a vibratory compression action of the plunger 13 is produced, which action may be increased or diminished by the operator through proper manipulation of the valve 76. As a result, a pounding pressure is established, by which the air cells in the body of the material are broken and the air permitted to escape and the particles of the material are compressed to a high degree of density to form a homogeneous block of great strength to withstand service and which is practically impervious to moisture throughout. This mode of compressing the material is an important feature of my invention, as it produces a superior type of block for the reasons stated. When the material has been compressed to the desired extent, the valve 76 is opened, thus restoring communication between the supply and return pipes, by which the water is caused to exhaust from the cylinder 12 and lower the ram and mold box, and is returned through the pipe 73 to the storage tank 59. The valve 76 is so arranged with relation to the table 31 that, in cases of emergency, a single attendant may control the valve and during the time period of compression release the block from the filled mold. It will be observed that the construction and arrangement of parts adapt the machine to be thoroughly and effectually controlled by a minimum number of attendants, two being commonly employed, but a single attendant in case of necessity may operate the machine at reduced speed.

In order to enable the table to be controlled and to lock it firmly against movement when the boxes are in their respective filling, compressing and discharge positions, the rim 29 of the carrier is provided at equidistant points on lines between the boxes with locking notches 77 and ratchet teeth 78 at opposite sides thereof. These teeth and notches are provided to coöperate with a locking dog 79 carried by a pivoted lever 80 normally projected into locking position by a spring 81. The dog is formed with a V-shaped face to ride over the ratchet teeth and is adapted to snap into the notches to lock the carrier against rotation. The ratchet teeth permit the carrier to be rotated in either direction and coöperate with the dog to slack the momentum of the carrier as it is swung around, so that the carrier will be at nearly a state of rest when the dog snaps into a receiving notch in order to prevent strain upon the parts at the time of the locking action. When it is desired to return the carrier the dog is released by the carrier, whereupon the carrier may be moved by hand or power to the desired degree, the dog instituting a locking action on the next succeeding set of teeth, as will be readily understood.

From the foregoing description, taken in connection with the drawings, the construction and mode of operation of my improved molding apparatus will be readily understood, and it will be seen that it provides an apparatus which possesses great strength and durability and enables the material to be compressed to a high degree of density, which is adapted to be easily operated and controlled, and by the use of which a maximum number of blocks or articles may be produced within a given period of time.

While I have described the apparatus as of the horizontal type, it will be understood that it may be vertically arranged, and that other changes falling within the spirit and scope of the invention as defined in the appended claims may be made without departing from the invention.

Having thus fully described the invention, what is claimed as new, is:—

1. A molding apparatus embodying a mold box, forming means coöperating therewith, said means including a movable element, a fluid pressure mechanism for moving said element to compression position, said mechanism including a pumping means operative to produce variations of pressure in the supplied fluid, to cause said movable element to vibrate and exert a pounding pressure on the material.

2. A molding apparatus embodying a receptacle for the material, means for compressing the material, said means including a movable element, fluid pressure means for operating said element, said means including a pumping mechanism operative to produce a fluctuating fluid pressure to cause said movable element to exert a vibratory or pounding pressure on the material, and manually controlled means for further varying the fluctuations of the fluid pressure and the vibratory action of the movable elements.

3. A molding apparatus embodying a receptacle for the material, means for compressing the material, said means including a movable element, a hydraulic ram for actuating said element, a pumping mechanism for supplying fluid for the ram, said pumping mechanism operating to automatically produce fluctuations of pressure in the supply of fluid to effect a vibratory pounding motion of said element, and manually controlled means for increasing or diminishing the fluctuations of pressure.

4. A molding apparatus embodying a receptacle for the material, means for compressing the material, said means including a movable pressure element, a hydraulic circuit including a ram for operating said element, and a pounding mechanism operative to force fluid under fluctuating pressures through said circuit, to cause said element to exert a vibratory or pounding pressure on the material.

5. A molding apparatus embodying a stationary forming element, a mold box movable toward and from the same, a pressure element for moving the mold box, a hydraulic ram for operating said pressure element, a fluid pressure circuit connected with the ram, and a pumping mechanism connected with the circuit and constructed to force a fluid therethrough with variable fluctuations of pressure.

6. A molding apparatus comprising a receptacle for the material, compressing means coöperating with said receptacle, a hydraulic ram for producing a relative motion of the parts, and a hydraulic circuit connected with the ram and including a pump constructed to force the acting fluid under a constantly fluctuating pressure.

7. A molding apparatus comprising a frame, a stationary forming plane carried by the frame, a pressure element arranged in line with said forming element, a mold box mounted to move into and out of alinement with said elements and toward and from the forming element, a flow circuit, a hydraulic ram arranged in said circuit for operating the pressure element, and a pumping mechanism for forcing the fluid through said pumping mechanism being constructed to force fluid with a fluctuating pressure.

8. A molding apparatus embodying a frame, a stationary core carried by the frame, a mold box movable toward and from the core, a plunger for advancing and retracting the mold box, and fluid pressure means for operating the plunger to provide an automatic vibratory feed motion thereof and a pounding pressure on the material, said fluid pressure means including a pump having a variable forcing action.

9. In a molding apparatus, a mold box having a stationary side and stationary frame pieces at the ends thereof, a hinged side carried by the end pieces, a bottom fixed to and movable with the hinged side, swinging end pieces provided with inwardly offset members hinged to the fixed side at a point in rear of the body thereof, and locking means for connecting the hinged sides and ends.

10. In a molding apparatus, a mold box having a stationary side and stationary frame pieces at the ends thereof, a hinged side carried by said frame pieces and provided with locking projections, a bottom carried by and movable with the hinged side, end portions having inwardly offset members hinged to the fixed side at a point in rear thereof and provided with guide member or keepers to receive said locking projections, and locking devices on the end pieces to engage said projections.

11. In a molding apparatus, a mold box having a stationary side provided with strengthening members on the outer face thereof, stationary frame pieces at the ends thereof, a hinged side mounted on said frame pieces and provided at its ends with locking projections, end pieces provided with bars having slotted keepers at their forward ends for the reception of said projections and inwardly bent rear ends hinged to the strengthening members of the stationary side, and pivoted locking devices having locking arms to engage said projections.

12. A molding apparatus embodying a press, a fluid pressure supplying means including a pumping mechanism for vibrating the movable member of the press, said pumping mechanism being normally operative for producing fluctuations in the fluid pressure and consequent variable vibrations of the movable member of the press to cause the same to exert a pounding pressure on the material being compressed.

13. A molding apparatus comprising a press, fluid pressure means for automatically imparting a vibratory pounding motion to the movable member of the press, and means for controlling the flow of the fluid pressure to vary the normal vibratory action.

14. A molding apparatus comprising a frame, an annular carrier mounted to rotate in a circular path upon the frame, mold boxes mounted upon and beyond the periphery of said carrier, a stationary forming element upon the frame disposed at one point in the path of movement of the mold boxes, and fluid pressure operated means located in line with said forming element for successively adjusting the mold boxes toward and from the same.

15. A molding apparatus comprising a frame, an annular carrier mounted to rotate upon the frame, said carrier being provided with guides and abutments, mold boxes disposed upon and projecting beyond the periphery of the carrier, said boxes being slidably mounted on the guides and provided with abutments to engage said abutments on the carrier, whereby the boxes are adapted to be held rigidly against lateral movement when in retracted position, a forming element mounted upon the frame at one point in the path of travel of the boxes, and fluid pressure operated means disposed in line with said element for adjusting the boxes on the guides toward and from the same.

16. A molding apparatus comprising a frame, an annular carrier mounted to rotate upon the frame, said carrier comprising upper and lower frame portions and guide rods connecting the same, mold boxes projecting beyond the periphery of the carrier and slidably mounted on said rods, a stationary forming element supported by the frame in line with one point in the path of movement of the mold boxes, fluid pressure operated means disposed in line with said element for adjusting the mold boxes on the guide rods toward and from said element, and means for checking and locking the rotary carrier as each mold box moves into compressing position.

17. A molding apparatus embodying a frame, a stationary core carried by the frame, a mold box movable toward and from the core, a plunger for advancing and retracting the mold box, and means for operating the plunger to produce a normal automatic vibratory feed motion thereof, and a pounding pressure on the material.

18. A molding apparatus embodying a frame, a stationary core carried by the frame, a pressure head in guided connection with the frame for movement toward and from the core, a hydraulic plunger for moving the head toward and from the core, an annular rotary carrier on the frame carrying a series of mold boxes arranged upon the periphery thereof and intermittently movable between the core and head and movable by the head toward the core, a hydraulic circuit including a pump and a cylinder in which said plunger is mounted, and a controlling valve in said circuit.

19. A molding apparatus comprising a frame embodying triangular upper and lower portions formed by connected beams, and vertical tie rods connecting said beams, a stationary core carried by the upper portion of the frame between the rods, a pressure head in guided connection with the other rod for movement toward and from the core, an annular rotary carrier on the other rod, a series of mold boxes arranged on the periphery of the carrier and intermittently movable by the operation thereof, successively between the core and head and each movable on the carrier toward and from the core, means for controlling the movement of the carrier, a plunger for operating the plunger head, a hydraulic circuit including a pump and a cylinder in which the plunger is mounted, and a regulating valve in said circuit.

20. A molding apparatus comprising a frame, an annular carrier mounted to rotate upon the frame, said carrier being provided with equidistantly arranged sets of speed checking and locking elements, mold boxes mounted upon the carrier, forming means arranged for coöperation with the boxes at one point in their path of travel, and a locking device arranged for coöperation with said sets of checking and locking devices for diminishing the speed of the carrier and locking the same from movement as each mold box moves into forming position.

21. A molding apparatus comprising a frame, an annular rotary carrier mounted upon the frame, said carrier being provided with equidistantly arranged sets of ratchet teeth and locking notches, mold boxes supported by the rotary carrier, forming means arranged for coöperation with the boxes at one point in their path of movement, and a spring controlled speed checking and locking device arranged for coöperation with said ratchet teeth and locking notches, to arrest the speed of the carrier and lock the same for movement as each mold box moves into forming position.

22. A molding apparatus comprising a frame formed of bottom and head beams, a triangular group of rods connecting the opposite ends of said beams, a carrier mounted to rotate upon the single rod connecting the beams at one end and supporting a series of movable mold boxes, a fixed forming element supported by the head beams at one point in the path of travel of the boxes, a pressure head slidably mounted on the rods connecting the opposite ends of the frame beams, and a fluid pressure operated plunger for raising and lowering said head.

23. A molding apparatus comprising a frame, a rotary carrier mounted on the frame, mold boxes movably mounted on the carrier, a fixed forming element upon the frame, a movable head on the frame for adjusting the mold boxes toward and from said element, a plunger for operating the head, and means for supplying fluid pressure for operating said plunger, said means including a pumping mechanism for producing a fluctuating pressure, to effect a vibratory motion of the head when the box is in forming position.

24. A molding apparatus comprising a support, a stationary forming element, a mold box movable toward and from the same, a plunger for actuating the said box, a fluid storage reservoir, a circuit leading therefrom and embodying supply and return portions connected at their remote ends, a pumping mechanism communicating with the reservoir and supply portion of the circuit and adapted to force the fluid with a fluctuating pressure through the latter, and a valve in said circuit for regulating said pressure.

25. In a molding apparatus, a mold box embodying a stationary side, stationary frame pieces at the ends thereof, a hinged side carried by said frame pieces and having notched locking projections at the ends thereof, a bottom carried by and movable with the hinged side, hinged ends provided with slotted guide members for the passage of said locking projections, vertically swinging locking devices on the ends and having locking arms to engage the notches in the locking projections, and means for limiting the swinging movement of said locking devices in one direction.

In testimony whereof I affix my signature in presence of two witnesses.

WILLIS H. FISHER.

Witnesses:
FRANCES T. BANNON,
SADIE E. BAKER.